Patented Oct. 17, 1950

2,526,555

UNITED STATES PATENT OFFICE 2,526,555

PREPARATION OF N-SUBSTITUTED AND N,N-DISUBSTITUTED BETA-AMINO SATURATED ALIPHATIC MONOCARBOXYLIC ACIDS

Thomas L. Gresham and Forrest W. Shaver, Akron, Ohio, assignors to The B. F. Goodrich Company, New York, N. Y., a corporation of New York No Drawing. Application November 19, 1948, Serial No. 61,124

12 Claims. (Cl. 260—534)

This invention relates to the preparation of nitrogen and oxygen containing organic compounds, particularly N-cycloalkyl-, N,N-dicycloalkyl-, and N-alkyl-N-cycloalkyl-beta-amino saturated monocarboxylic acids, such as propionic aid, and pertains particularly to the preparation of such compounds by the reaction of certain N-substituted amines with beta-lactones.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydracrylic acid lactone) which has the structure

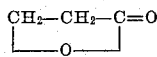

is economically obtained from ketene and formaldehyde.

We have now discovered that beta-propiolactone, and also liquid homologs thereof (that is, liquid saturated aliphatic beta-lactones) will react with primary and secondary monoamines of the formula

wherein $R_1$ is cycloalkyl and $R_2$ is selected from the class consisting of hydrogen, alkyl and cycloalkyl, in a completely organic liquid medium (that is, a medium formed by admixing the two reactants either alone or in the presence of a substantially inert organic solvent or diluent) to form in very high yields nitrogen and oxygen containing organic compounds of the general structure

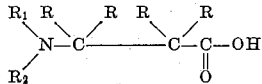

wherein each R is hydrogen or a lower alkyl group, and $R_1$ and $R_2$ have the same meaning as above. For example, the compounds obtained by the reaction of beta-propiolactone with cycloalkyl primary monoamines are N-cycloalkyl-beta-amino propionic acids of the formula

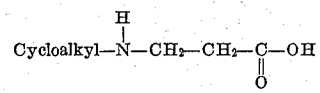

the compounds obtained from beta-propiolactone and dicycloalkyl amines are N,N-di-cycloalkyl-beta-amino propionic acids of the formula

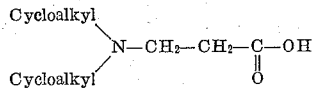

and the compounds obtained from beta-propiolactone and N-alkyl cycloalkyl amines are N-cycloalkyl-N-alkyl-beta-amino propionic acids possessing the formula

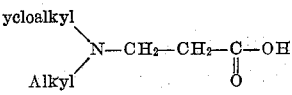

The reaction between beta propiolactone and amines of the formula

in a completely organic medium proceeds substantially as shown by the following equation:

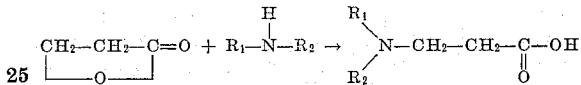

This reaction provides a convenient and economical method of obtaining numerous organic compounds useful as organic intermediates and for other purposes, many of which compounds have not heretofore been prepared or have been obtained only with difficulty and/or from relatively costly raw materials.

As disclosed hereinabove, amines of the formula

wherein $R_1$ is cycloalkyl and $R_2$ is selected from the class consisting of hydrogen, alkyl and cycloalkyl, are utilized in the reaction of this invention. Among these amines (which it will be noted have all of the nitrogen valences satisfied by hydrogen, alkyl or cycloalkyl, at least one of the valences being satisfied by hydrogen and one by a cycloalkyl radical) are N-cycloalkylamines such as cyclopropylamine, cyclobutylamine, cyclopentylamine, cyclohexylamine, cycloheptylamine, cyclooctylamine, 3-isopropyl-1,2,2-trimethyl cyclopentylamine, 2,2,3,3-tetramethyl-cyclopentylamine and the like; N,N-dicycloalkyl amines such as dicyclopentylamine, dicyclohexylamine and the like; N-cycloalkyl-N-alkyl amines such as N-methyl cyclohexylamine, N-ethyl cyclohexylamine, N-propyl cyclohexylamine, N-heptyl cyclohexylamine, N-isopropyl cyclohexylamine and the like. Slightly higher yields of product are obtained when the N-cycloalkyl amines are reacted with beta-lactones, although other of the amines listed above may also be successfully utilized.

Beta-propiolactone is the preferred beta-lactone for use in this process, not only because it is more readily available and more economical in cost than other beta-lactones, but also because its use results in the production of highest yields of purest amino acids, and because the compounds directly resulting from its reaction are quite valuable chemicals per se (being especially useful as insecticides and fungicides) and are also useful in the preparation of many other valuable compounds. However, other saturated aliphatic beta-lactones are also useful in the process, among which are such homologs of beta-propiolactone as beta-butyrolactone, beta-valerolactone, beta-isovalerolactone, alpha-methyl beta-propiolactone, alpha-ethyl beta-propiolactone, beta-isopropyl para-propiolactone, beta-methyl beta-valerolactone, etc., all of which are liquid and possess the general structure

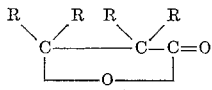

wherein each R is hydrogen or a lower alkyl group, so that the lactone contains from 3 to 6 carbon atoms.

Although this invention is limited to reactions carried out in a completely organic liquid medium, no other special conditions are necessary. The quantities of beta-lactone and amine employed are not critical but it is generally preferred to use equimolecular proportions of lactone and amine or an excess of the amine, for example, from 1 to 2 moles of amine for each mole of lactone, since the presence of excess beta-lactone is of no particular advantage and in fact may be disadvantageous due to the formation of lactone polymer.

The reaction is preferably carried out at atmospheric pressure and at a temperature in the range of —30° to 150° C., more preferably at 0° to 150° C. However, other temperatures and pressures may be used provided the reactants are maintained in the liquid condition during the reaction.

While the presence of an inert organic solvent during the reaction is not essential, the use of such a solvent is desirable since stirring of the reaction mixture and heat removal is thereby facilitated, and the tendency for the beta-lactone to polymerize is repressed. The specific nature and amount of the solvent used, if any, are not at all critical since any polar or non-polar organic solvent may be used so long as it is capable of existing in the liquid state, and is substantially inert to the reactants, under the conditions used. It is desirable that the solvent be volatile, preferably that it have a boiling point below 150° C. since it can then be more readily recovered and reused in the process. Specific inert solvents which are effective include benzene, toluene, pentanes, hexanes, and other liquid saturated aliphatic or aromatic hydrocarbons; chlorinated liquid derivatives of such hydrocarbons such as chlorobenzene and ethylene dichloride; liquid ethers such as diethyl ether, dipropyl ether, etc.; liquid esters such as methyl acetate, ethyl acetate, methyl propionate and the like; liquid organic nitriles such as acetonitrile, propionitrile, benzonitrile, etc.; and liquid ketones such as acetone, methyl ethyl ketone, etc. Liquid alcohols are also substantially inert to the reactants under the preferred conditions of the reaction (that is, at temperatures of —30° to 150° C. and, since the reaction is effected in a completely organic medium, in the absence of inorganic acids and bases), despite the fact that alcohols do react with beta-lactones under other conditions. Accordingly, such alcohols may be employed as solvents if desired, examples of suitable alcohol solvents being methanol, ethanol, ethylene cyanohydrin, ethylene chlorohydrin and especially tertiary alcohols such as tertiary butanol and the like. It is to be understood that liquid mixtures of the above compounds may be used as the solvent even though one or more of the components of the mixture is a solid under the operating conditions in the pure state. Solvents of this nature will dissolve the beta-lactone (beta-lactones of the kind used in this invention are generally soluble in polar organic solvents) but do not dissolve hydroxy-alkyl substituted beta-amino carboxylic acids (which are generally soluble in water but insoluble or very sparingly soluble in organic solvents) and hence in addition to providing a convenient medium for the reaction, afford a convenient means of separating and recovering the desired reaction product.

In carrying out the reaction of this invention it is generally preferable to add the amine, which is a liquid under ordinary conditions, to a solution of the beta-lactone in an organic solvent at such a rate that about ½ to 3 hours are required for the addition of the entire amount of the amine, and with continued agitation of the solution during the addition. Alternatively, however, the beta-lactone may be added to a stirred solution of the amine in an organic solvent, if desired, without affecting the fundamental course of the reaction to give the amino acid, or any other procedure for bringing the reactants together in an organic medium at the desired temperature is also effective. The product generally precipitates as crystals and is easily separated from the reaction mixture by filtering or other usual means. A substantially pure N-cycloalkyl-, N,N-dicycloalkyl- or N-cycloalkyl, N-alkyl-beta-amino saturated aliphatic monocarboxylic acid is obtained by recrystallizing the solid material from an alcohol or other solvent. Other methods of recovering the product from the reaction mixture may also be employed as will be understood by those skilled in the art.

The process of this invention is further illustrated by the following examples. It should be understood, however, that variations in the examples in accordance with the foregoing disclosure may be effected without departing from the invention. In the examples all parts are by weight.

EXAMPLE I 72 parts (1 mole) of beta-propiolactone are dissolved in 312 parts of acetonitrile. While maintaining the temperature of this solution at 20°–30° C., 99 parts (1 mole) of cyclohexylamine are slowly added. As the addition of the amine continues a solid precipitates from the solution and after the amine addition is complete, the solid is removed from the reaction mixture by filtering. The solid is next recrystallized from methanol and 162.5 parts (95%) of substantially pure N-cyclohexyl beta-amino propionic acid (M. P. 170°–171.5° C.; identified by potentiometric titration and analysis) are obtained.

Analysis

| Calculated for $C_9H_{17}NO$ | Found |
|---|---|
| C, 71.10 | 71.05 |
| H, 10.74 | 10.60 |
| N, 5.55 | 5.50 |

EXAMPLE II

Example I is repeated except that the beta-propriolactone is added to a solution of the cyclohexylamine in the acetonitrile. A 94% yield of N-cyclohexyl beta-amino propionic acid (M. P. 171°–172° C.) is obtained.

EXAMPLE III 99 parts (1 mole) of cyclohexylamine are dissolved in 284 parts of ether. The temperature of this solution is maintained at about 25° C. during the slow addition of 72 parts (1 mole) of beta-propiolactone, the reaction mixture being constantly stirred. An insoluble viscous oil forms which is decanted from the reaction mixture. Upon standing, the oil crystallizes to a solid material. Upon recrystallization from methanol a 40.9% yield of N-cyclohexyl beta-amino propionic acid (M. P. 170°–171° C.) is obtained.

EXAMPLE IV

Example III is repeated except that the cyclohexylamine is added to a solution of the beta-lactone in the ether. N-cyclohexyl beta-amino propionic acid (M. P. 171°–172° C.) is again obtained in substantial yield.

EXAMPLE V 72 parts (1 mole) of beta-propiolactone are slowly added to 181 parts (1 mole) of dicyclohexylamine, the temperature of the reaction mixture being maintained at 145°–150° C. As the addition continues a solid precipitates from the reaction mixture and when the addition of the lactone is complete the solid is removed by filtering. The solid is recrystallized from methanol and there is obtained a 74% yield of N,N-dicyclohexyl beta-amino propionic acid (M. P. 129°–130.5° C., identified by potentiometric titration and analysis).

Analysis

| Calculated for $C_{15}H_{27}NO$ | Found |
|---|---|
| C, 63.12 | 63.09 |
| H, 10.01 | 10.11 |
| N, 8.18 | 8.16 |

EXAMPLE VI

Example I is repeated except that N-ethyl cyclohexylamine is substituted for the cyclohexylamine. N-cyclohexyl-N-ethyl beta-amino propionic acid is obtained in good yield, although the yields are not as high as those obtained when N-cycloalkyl- and N,N-dicycloalkyl amines are utilized in the reaction.

While the above examples illustrate the process of this invention, they by no means include all the various embodiments. Thus, the examples may be repeated with any of the cycloalkyl-substituted amines set forth hereinabove whereupon still other N-cycloalkyl-, N,N-dicycloalkyl- and N-cycloalkyl-N-alkyl-substituted-beta-amino carboxylic acids are obtained in good yield. Moreover, other saturated aliphatic beta-lactones may be substituted for beta-propiolactone, as disclosed, with but small reduction in yield of the desired product.

Accordingly, it will be understood that the invention is not intended to be limited to specific embodiments but only as required by the spirit and scope of the appended claims.

We claim:

1. The method which comprises bringing together in a completely organic liquid medium reactants consisting of a liquid saturated aliphatic beta-lactone of the formula $$\begin{array}{c} R \quad R \quad R \quad R \\ \diagdown \phantom{xx} \diagup \\ C \!\!-\!\!-\!\!-\!\! C \!\!-\!\! C \!\!=\!\! O \\ \diagdown \phantom{xx} \diagup \\ O \end{array}$$

wherein each R is selected from the class consisting of hydrogen and lower alkyl, and an amine of the formula $$\begin{array}{c} H \\ | \\ R_1\!\!-\!\!N\!\!-\!\!R_2 \end{array}$$

wherein $R_1$ is a cycloalkyl radical and $R_2$ is selected from the class consisting of hydrogen, cycloalkyl and alkyl, whereupon chemical reaction occurs between said beta-lactone and said amine, and then recovering from the reacted liquid mass a nitrogen and oxygen containing organic compound formed by said reaction and having the structure $$\begin{array}{c} R_1 \;\; R \quad\quad R \;\; R \quad\quad R \\ \diagdown \;\;\diagup \quad\quad\quad \diagdown \;\;\diagup \\ N\!\!-\!\!C\!\!-\!\!-\!\!-\!\!-\!\!C\!\!-\!\!C\!\!-\!\!OH \\ \diagup \quad\quad\quad\quad\quad\quad \parallel \\ R_2 \quad\quad\quad\quad\quad\quad\quad O \end{array}$$

wherein R, $R_1$ and $R_2$ have the same meaning as above.

2. The method which comprises bringing together in a completely organic liquid medium reactants consisting of beta-propiolactone and an amine of the formula $$\begin{array}{c} H \\ | \\ R_1\!\!-\!\!N\!\!-\!\!R_2 \end{array}$$

wherein $R_1$ is a cycloalkyl radical and $R_2$ is selected from the class consisting of hydrogen, cycloalkyl and alkyl, while maintaining the temperature of the liquid at −30° to 150° C. whereupon chemical reaction occurs between the beta-propiolactone and said amine, and then recovering from the liquid reacted mass a nitrogen and oxygen containing organic acid formed by the said reaction and having the structure $$\begin{array}{c} R_1 \\ \diagdown \\ N\!\!-\!\!CH_2\!\!-\!\!CH_2\!\!-\!\!C\!\!-\!\!OH \\ \diagup \quad\quad\quad\quad\quad\quad \parallel \\ R_2 \quad\quad\quad\quad\quad\quad O \end{array}$$

wherein $R_1$ and $R_2$ have the same meaning as above.

3. The method which comprises bringing together in a completely organic liquid medium reactants consisting of beta-propiolactone and a cycloalkylamine, while maintaining the temperature of the liquid at −30° to 150° C., whereupon chemical reaction occurs between the beta-propiolactone and said amine, and then recovering from the reacted liquid mass an N-cycloalkyl beta-amino propionic acid.

4. The method of claim 3 wherein the cycloalkylamine is cyclohexylamine, the N-cycloalkyl beta-amino propionic acid recovered being N-cyclohexyl beta-amino propionic acid.

5. The method which comprises bringing together in a completely organic liquid medium reactants consisting of beta-propiolactone and a dicycloalkylamine, while maintaining the temperature of the liquid at −30° to 150° C., whereupon chemical reaction occurs between the beta-propiolactone and said amine, and then recovering from the reacted liquid mass an N,N-dicycloalkyl beta-amino propionic acid.

6. The method of claim 5 wherein the dicycloalkylamine is dicyclohexylamine, the N,N-dicycloalkyl beta-amino propionic acid recovered being N,N-dicyclohexyl beta-amino propionic acid.

7. The method which comprises bringing together in a liquid solvent selected from the class consisting of hydrocarbons, chlorinated hydrocarbons, ethers, esters, nitriles, ketones and alcohols, reactants consisting of a liquid saturated aliphatic beta-lactone of the formula

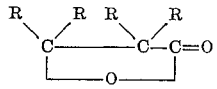

wherein each R is selected from the class consisting of hydrogen and lower alkyl, and an amine of the formula

wherein R₁ is a cycloalkyl radical and R₂ is selected from the class consisting of hydrogen, cycloalkyl and alkyl, whereupon chemical reaction occurs between said beta-lactone and said amine, and then recovering from the reacted liquid mass a nitrogen and oxygen containing organic compound formed by said reaction and having the structure

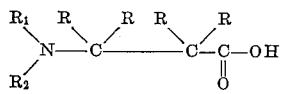

wherein R, R₁ and R₂ have the same meaning as above.

8. The method which comprises bringing together in the presence of a liquid solvent selected from the class consisting of hydrocarbons, chlorinated hydrocarbons, ethers, esters, nitriles, ketones and alcohols, reactants consisting of beta-propiolactone and a cycloalkylamine, while maintaining the temperature of the liquid at −30° to 150° C., whereupon chemical reaction occurs between the beta-propiolactone and said amine, and then recovering from the reacted liquid mass an N-cycloalkyl beta-amino propionic acid.

9. The method of claim 8 wherein the cycloalkylamine is cyclohexylamine, the N-cycloalkyl beta-amino propionic acid recovered being N-cyclohexyl beta-aminopropionic acid.

10. The method which comprises bringing together in the presence of a liquid solvent selected from the class consisting of hydrocarbons, chlorinated hydrocarbons, ethers, esters, nitriles, ketones and alcohols, reactants consisting of beta-propiolactone and a dicycloalkylamine, while maintaining the temperature of the liquid at −30° C. to 150° C., whereupon chemical reaction occurs between the beta-propiolactone and said amine, and then recovering from the reacted liquid mass an N,N-dicycloalkyl beta-amino propionic acid.

11. The method of claim 10 wherein the dicycloalkylamine is dicyclohexylamine, the N,N-dicycloalkyl beta-amino propionic acid recovered being N,N-dicyclohexyl beta-amino propionic acid.

12. The method which comprises preparing a reaction mixture consisting of a liquid saturated aliphatic beta-lactone of the formula

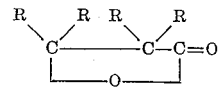

wherein each R is selected from the class consisting of hydrogen and lower alkyl, and an amine of the formula

wherein R₁ is a cycloalkyl radical and R₂ is selected from the class consisting of hydrogen, cycloalkyl and alkyl, whereupon chemical reaction occurs between said beta-lactone and said amine, and then recovering from the reacted liquid mass a nitrogen and oxygen containing organic compound formed by said reaction and having the structure

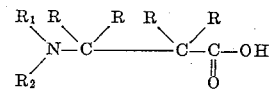

wherein R, R₁ and R₂ have the same meaning as above.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,372,654 | Bergel et al. | Apr. 3, 1945 |
| 2,375,005 | Kung | May 1, 1945 |
| 2,377,814 | Schnider | June 5, 1945 |
| 2,442,143 | Pickel et al. | May 25, 1948 |
| 2,446,615 | Shive | Aug. 10, 1948 |

OTHER REFERENCES

Basler, Ber. Deut. Chem., vol. 17, pages 1502–1503 (1884).

Johansson, Chem. Zentr., vol. 1916 II, pages 557–558.